(12) United States Patent
Stork et al.

(10) Patent No.: US 9,757,930 B2
(45) Date of Patent: Sep. 12, 2017

(54) FILM HEAT SEALING AND TRIM APPARATUS

(71) Applicant: TEXWRAP PACKAGING SYSTEMS LLC, Washington, MO (US)

(72) Inventors: Brian R. Stork, Washington, MO (US); Keith E. Witte, Herman, MO (US)

(73) Assignee: TEXWRAP PACKAGING SYSTEMS LLC, Washington, MO (US)

( * ) Notice: Subject to any disclaimer, the term of this patent is extended or adjusted under 35 U.S.C. 154(b) by 283 days.

(21) Appl. No.: 14/255,175

(22) Filed: Apr. 17, 2014

(65) Prior Publication Data

US 2015/0298450 A1    Oct. 22, 2015

(51) Int. Cl.
*B29C 65/74* (2006.01)
*B32B 37/06* (2006.01)
(Continued)

(52) U.S. Cl.
CPC ............. *B32B 37/06* (2013.01); *B29C 65/18* (2013.01); *B29C 65/7439* (2013.01); *B29C 66/1122* (2013.01); *B29C 66/133* (2013.01); *B29C 66/4322* (2013.01); *B29C 66/849* (2013.01); *B29C 66/91641* (2013.01); *B29C 66/932* (2013.01); *B29C 66/934* (2013.01); *B29C 66/961* (2013.01); *B29C 65/14* (2013.01); *B29C 65/16* (2013.01); *B29C 65/7435* (2013.01); *B29C 66/83423* (2013.01); *B29C 66/8748* (2013.01); *B29C 66/91212* (2013.01); *B29C 66/91231* (2013.01); *B29C 66/91651* (2013.01); *B29C 66/91653* (2013.01); *B29C 66/91655* (2013.01); *B29C 66/939* (2013.01); *B29C 66/9674* (2013.01); *B29L 2031/712* (2013.01);
(Continued)

(58) Field of Classification Search
CPC ..... B29C 66/932; B29C 66/934; B32B 37/06; B32B 38/004; Y10T 156/1087; Y10T 156/108; Y10T 156/12
See application file for complete search history.

(56) References Cited

U.S. PATENT DOCUMENTS 2,327,468 A * 8/1943 Stocker .................. B26D 1/225
                                                        156/251
2,660,218 A * 11/1953 Johnson .................. B29C 65/18
                                                        156/251
(Continued)

OTHER PUBLICATIONS

International Search Report and Written Opinion for PCT/US2015/024856 Dated: Jul. 2, 2015 pp. 11.
Internal Stork Fabricators lap seal system documents (3 pages).

*Primary Examiner* — Linda L Gray
(74) *Attorney, Agent, or Firm* — Thompson Hine LLP

(57) ABSTRACT

A sealing apparatus 200 for sealing together two film portions 202, 204 may include a heating element 206 positioned in relation to a pair of nip pressure devices 208, 210 for creating a seal 311 between the two film portions 202, 204 and trimming the two film portions 202, 204 at the created seal. A controller 214 is connected to the heating element 206 and is for connection to a power source for applying a variable amount of power to the heating element 206. The amount of power varies based on at least a speed of the two film portions 202, 204 passing the heating element 206.

21 Claims, 4 Drawing Sheets

(51) Int. Cl.
B32B 38/04 (2006.01)
B29C 65/18 (2006.01)
B29L 31/00 (2006.01)
B29C 65/00 (2006.01)
B29C 65/14 (2006.01)
B29C 65/16 (2006.01)

(52) U.S. Cl.
CPC ....... *B32B 2309/02* (2013.01); *B32B 2309/14* (2013.01); *B32B 2309/72* (2013.01); *B32B 2439/70* (2013.01)

(56) References Cited

U.S. PATENT DOCUMENTS

| | | | |
|---|---|---|---|
| 2,953,976 A * | 9/1960 | Hahn | B29C 65/1432 156/311 |
| 3,368,930 A * | 2/1968 | Beason | B29C 65/7439 156/251 |
| 3,749,635 A * | 7/1973 | Lagain | B26D 1/035 156/251 |
| 4,142,355 A * | 3/1979 | Chambley | H01B 13/0292 156/180 |
| 4,373,982 A | 2/1983 | Kreager et al. | |
| 5,466,326 A | 11/1995 | Cherney | |
| 6,058,998 A * | 5/2000 | Kristen | B29C 65/18 156/359 |
| 6,129,809 A | 10/2000 | Ellenberger et al. | |
| 7,281,362 B2 | 10/2007 | James et al. | 53/479 |
| 7,882,879 B2 * | 2/2011 | Patterson | B29C 65/18 156/358 |
| RE43,033 E | 12/2011 | James et al. | 53/479 |
| 2003/0168444 A1 | 9/2003 | Liakopoulos | |
| 2006/0107622 A1 | 5/2006 | James et al. | |
| 2011/0167772 A1 | 7/2011 | Piucci, Jr. et al. | |
| 2013/0031870 A1* | 2/2013 | Christman | B29C 66/81261 53/373.4 |

* cited by examiner

FILM HEAT SEALING AND TRIM APPARATUS

FIELD

The present disclosure relates to devices for heat sealing packaging films and trimming excess film from a sealed package. More specifically, this disclosure relates to heat sealing and trim devices that apply varying amounts of power to the film based on at least a speed of the film.

BACKGROUND

This section provides background information related to the present disclosure which is not necessarily prior art.

It is known to use hot wires or thermocouples to heat seal and simultaneously trim portions of film together. The film may be various types of thermoplastic films. Typically, two film portions are guided through a pair of pressure nippers so that a wire or thermocouple is positioned across a path of the two film portions causing the wire to seal the two film portions together and simultaneously separate or trim a waste of the film along the seal.

U.S. Pat. No. 7,281,362, entitled FILM SIDE SEALING APPARATUS WITH CLOSED-LOOP TEMPERATURE CONTROL OF A HEATER, and assigned to Shrink Packaging Systems Corporation, is an example of such a known apparatus and is incorporated by reference. This patent teaches the use of tight temperature control of a heating element using a closed loop system.

The inventors have discovered that such tight temperature control is unnecessary. In fact heat sealing and trimming may reliably be accomplished by pulsing power to the heating element in an open loop manner (i.e. without any feedback control signals), based only on the speed of the film passing the heating element. No accounting for the heating element temperature is needed to provide stable operation over extended time periods without any resin build-up. Described below is an energy efficient, open loop control that applies varying power levels to a heating element based on at least of speed of the film passing the heating element.

Open loop power pulsing for creating lap seals is known, as shown in FIGS. 1A and 1B. However, an important distinction between a lap seal and the present disclosure of a seal and trim apparatus is with respect to the trim and the nature of the seal formed. In creating a lap seal, two film portions 10 and 12 are overlapped as shown. Drive mechanisms, not shown, cause the two film portions to move in the direction of arrow 14 over drag wire 16. The film portions 10 and 12 are only to be sealed together, as indicated by cross-hatching at 18. There is no film trimming required or desired in forming a lap seal. In fact, the drag wire 16 is typically raised and lowered, as indicated at arrow 20. The drag wire 16 is typically lowered out of contact with the film portions to protect against drag wire 16 burning through the film portions 10 and 12 when the film is not moving. Further, drag wire 16 requires less power than required for a sealer and trimmer because the drag wire only seals two films portions together as opposed to sealing and trimming two film portions.

Prior to this disclosure no one appreciated that an open loop power control scheme could effectively and efficiently be applied to a seal and trim apparatus. The prior art, as discussed in U.S. Pat. No. 7,281,362 cited above, believed that a closed loop control for holding tight tolerances on the temperature of a heating element was needed to provide a robust reliable heat seal and trim device; or, if an open loop control was used, an unstable system would result in frequent stoppage of the machine for removing resin buildup on the heating element and the need for frequent operator adjustments to the power feed. As shown by the examples below, open loop control of power to the heating element can result in effective and efficient sealing and trimming of film portions by basing the power supplied on one or more of the speed of the film portions, the gauge of the film portions without controlling the temperature of the heating element.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
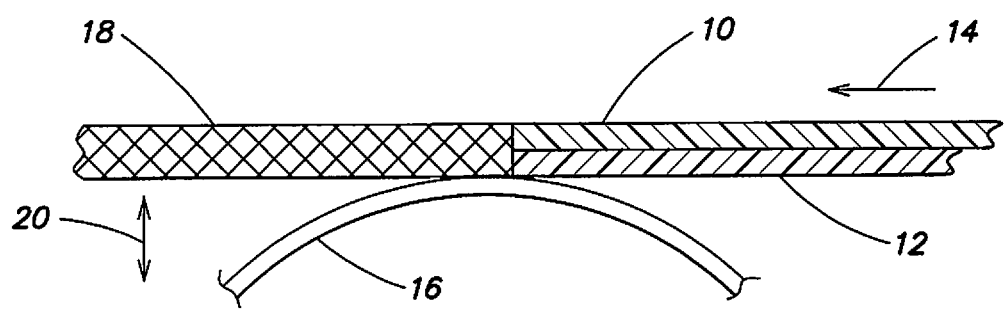
FIG. 1A is a partial elevation of a prior art lap seal device.
Figure 1B:
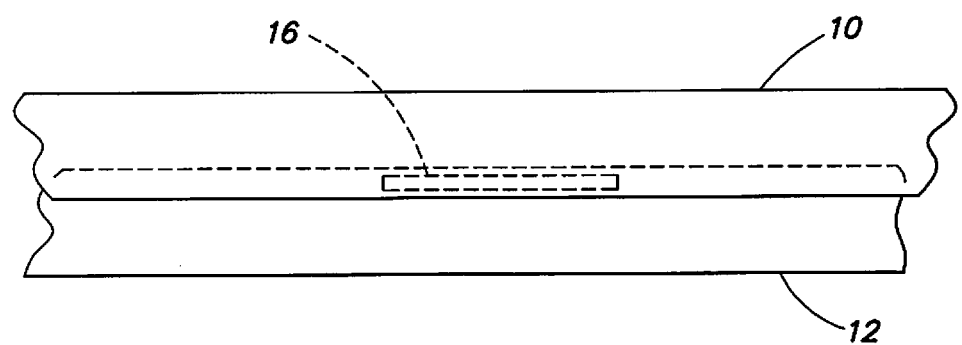
FIG. 1B is an overhead view of FIG. 1A.
Figure 2:
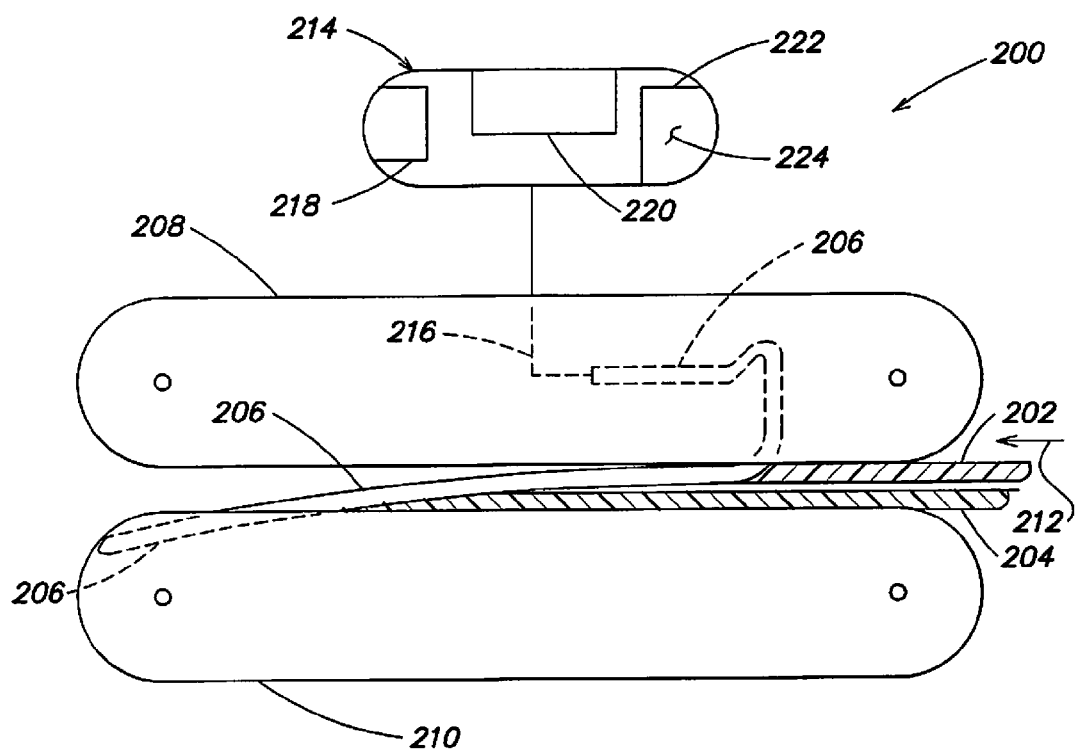
FIG. 2 is a partial graphical representation of an exemplary sealing apparatus.

FIG. 2 is a partial graphical representation of a sealing apparatus 200 for sealing together two film portions 202 and 204. A heating element 206 is shown positioned in relation to a pair of nip pressure devices 208, 210 for creating a seal between the two film portions 202, 204 and trimming the two film portions 202, 204 at the created seal (not shown). FIG. 2, so that the position of heating element 206 is clearly shown, does not show the film portions 202, 204 sealed together to the left of heating element 206 or the film portions passing the heating element. The nip pressure devices 208, 210 may be similar to those known in the art. The nip pressure devices 208, 210 also may include drive rollers, idler rollers, and associated belts (not shown) to pull film portions 202, 204 past heating element 206 in the direction of arrow 212 at the desired speed. In addition, the nip pressure devices may include nip rollers or other structure (not shown) that creates intimate contact between the film portions 202, 204 as they pass heating element 206 to ensure the film portion are sealed together. The two film portions 202, 204 those skilled in the art will appreciate.

Heating element 206 is shown mounted within nip pressure device 208, however, the heating element may be mounted to other structure, such as nip pressure device 210 or to a frame or housing (not shown) of the apparatus 200 or other appropriate connection for placing the heating element 206 between the nip pressure devices 208, 210 during operation. Heating element 206 may be thermocouple having a metal sleeve or pipe and an integrated temperature sensor (not shown) such as a Type J thermocouple available from Watlow Electric Manufacturing Company, or it could be a heated wire or rod without any temperature sensing capability. Any thermocouple or temperature sensor used to detect a temperature of heating element 206 need only be used for information and for use with an over-temperature safety mechanism only and not for controlling the temperature of the heating element 206 or the speed of the film portions 202, 204.

Figure 3:
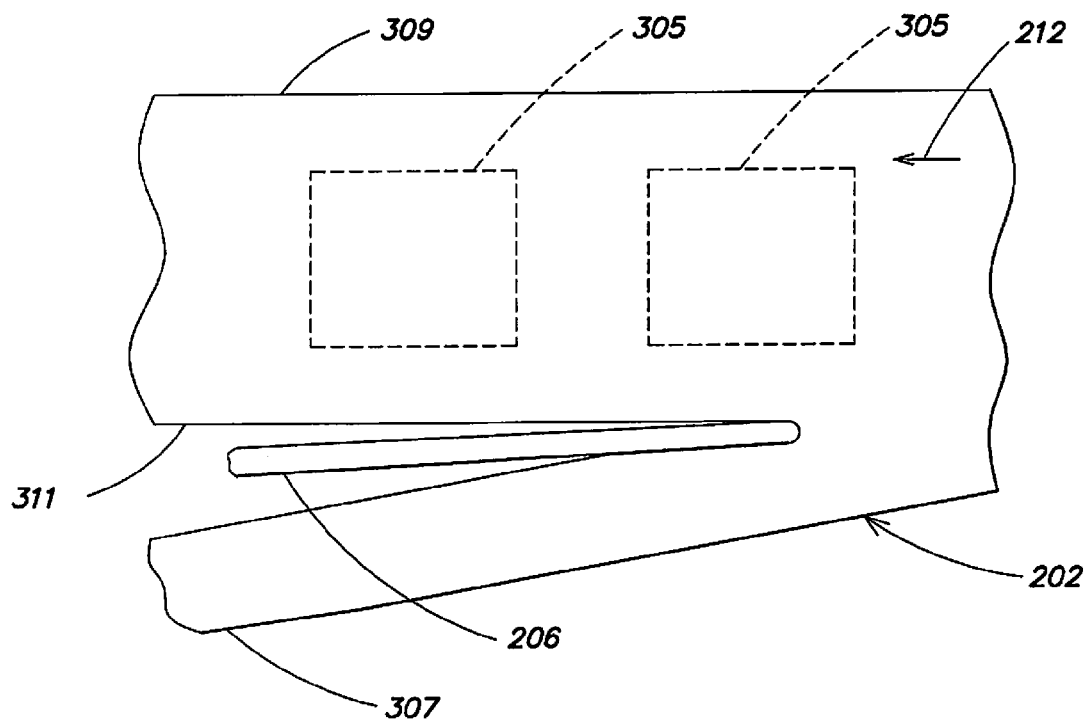
FIG. 3 is an overhead view of a portion of FIG. 2.

FIG. 3 shows an overhead view of a portion of an assembly line where packages 305 are being packaged within a film. The top view only shows top film portion 202, which after the two film portions 202, 204 are trimmed a scrap portion 307 and a package portion 309 are formed. Heating element 206 creates a seal, indicated at line 311, for sealing film portions 202 and 204 together and simultaneously trims scrap portion 307 from the package portion 309. For clarity, FIG. 3 does not show the conveyor systems that carry packages 305, nor does it show the nip pressure devices 208, 210, or any of the other apparatus that is typically a part of a shrink wrap assembly line.

A controller 214, shown in FIG. 2, is connected to the heating element 206 via electrical cable or wires 216. Controller 214 includes a connector 218 for connection to a power source (not shown). Controller 214 is programmed and equipped for applying a variable amount of power to the heating element 206. The controller 214 may include a modifiable square wave pulse generator to provide power to the heating element 206 at a user defined interval. The variable amount of power may refer to either the level of power applied or to a length of time a given amount of power is applied or a combination of both. It should be appreciated that both the level of power and the time duration that a level is applied to the heating element will influence the temperature of the heating element.

The amount of power applied varies based on at least a speed of the two film portions 202, 204 passing the heating element 206 during operation of a production line. As used in this disclosure when discussing power the terms "amount" and "varying" or "variable" or the like may include a level of power and/or in the case of power pulses the terms may refer to a level of power applied for a given period of time. With respect to power pulses a reference to an amount of power or variable level of power may refer to a period of time a pulse of power is applied to the heating element. The controller 214 may use any appropriate circuitry for controlling the power applied to the heating element 206. One example of such circuitry may include modifiable square wave pulse generators embodied as software to control solid state relays to turn on at a set frequency interval allowing electricity to flow to heating element 206. The square wave generator on-time per frequency interval may be calculated in processor 220 by use of an interpolation or look-up table stored in memory 222. Processor 220, in the form of a programmable computing device, may use any known scheme to control the amount of power delivered to the heating element at different speeds of film. One scheme is to use a known interpolation formula to build the interpolation table after receiving two data points from an operator, such as a percent of power at a low operating speed and a percent of power at a high operating speed. The processor 220 may then use the interpolation formula to build a table of percent of power to be applied at speeds between the two data points entered. The same formula, with slight modifications, may also be used to extrapolate percentages of power to be applied for speeds that are above or below the two data points entered. One example of an interpolation formula for determining an amount of power to be applied to the heating element is the following:

$$y = y_0 + (y_1 - y_0)\frac{x - x_0}{x_1 - x_0},$$

where y are units of power and x are units of speed. Specifically, where $x_0$ is the percent power to be applied at low speed $y_0$, $x_1$ is the percent power to be applied at high operating speed $y_1$, and x and y are the percent power and speed to be solved for at other possible speeds. Of course, one or more interpolation and/or extrapolation tables may be simply stored in memory 222 as look-up tables during manufacture of the sealer based on empirical testing done at various speeds and power intervals. Providing power pulses is preferred to prevent the heating element 206 from becoming overheated.

However, if a temperature sensor (not shown) is included as part of heating element 206, the controller 214 may form a part of an excessive heat indicator 224 that causes a warning signal to be communicated to a user if the heating element 206 becomes hot enough to potentially cause damage to the packaging or assembly apparatus. The warning communicated can take any form that may be appropriate such as a visual warning light, a visual warning on a display screen, an audible sound or voice, or a combination of audio and visual warnings.

As best seen in FIG. 2, the heating element 206 is elongated and positioned at a non-zero angle relative to a plane in which the two film portions 202, 204 are moving immediately prior to the two film portions 202, 204 contacting the heating element 206. The heating element 206, depending on the design requirements and the type of seal and trim required, may also be a pivoting disc, a vertical wire, an inclined elongated metal tube, a non-contact radiant device, and a laser. No matter what the form factor of heating element 206 is a portion of the heating element or the discharge of energy from the heating element should be positioned between the pair of nip pressure devices 208, 210 when in use.

The power source connected to controller 214 via connector 218 is typically electricity and at least one of current, voltage, and wattage is varied by the controller 214 to vary a heat level of the heating element 206. Processor 220 may be any appropriate computing device such as a microprocessor, programmable logic array, specialized integrated circuit, or other device.

Figure 4:
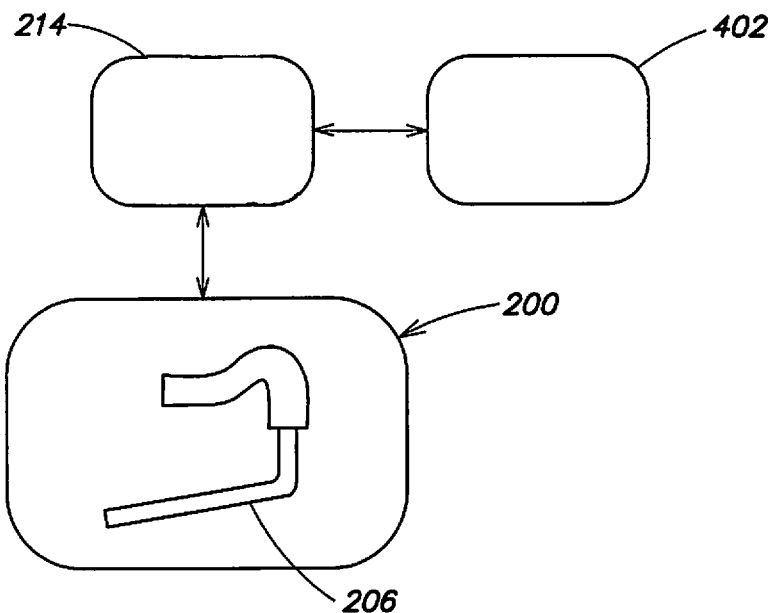
FIG. 4 is a block diagram of an exemplary sealing apparatus.

As shown at FIG. 4, the controller 214 may include a user interface 402 for inputting an amount of power to be applied to the heating element 206 at two or more speeds of the unshown film portions 202, 204. The controller 214 may then generate an interpolated power curve, as described above, for power to be applied to the heating element over a range of film speeds between each of the power amounts inputted at the two or more speeds. The controller 214 then applies the power amount to the heating element 206 according to the interpolated power curve. The user interface 402 may be any appropriate man-machine interface. Examples of user interface 402 may include a display screen, with a keyboard and/or a mouse, a touch screen with a virtual keyboard and number pad, a voice recognition system, or any combination of input and output devices for interfacing with a user. The controller 214, as indicated above, may also generate an extrapolated power curve for power to be applied to the heating element 206 at film speeds above or below each of the power levels inputted at the two or more speeds with the controller 214 applying the power level to the heating element 206 according to the extrapolated power curve.

As can be seen from the above disclosure the controller 214 controls the amount of power in an open-loop manner. This is a significant difference to the prior art that required closed-loop feedback control. The open-loop control allows for the use of less equipment and a simpler control scheme. It is also believed that the open-loop control is superior to the prior art closed-loop control because it provides better seal quality in systems that experience a change in film speeds during manufacturing. The prior art closed-loop control set a specific temperature for a given type and speed of film but did not change the temperature if the film speed changed. Significantly different heating element temperatures are required to produce quality seals at a film speed of 20 feet per minute compared to a film speed of 200 feet per minute. The open-loop control of this disclosure allows for direct, efficient control of a seal trimmer where the film speeds will varying during manufacturing.

Figure 5:
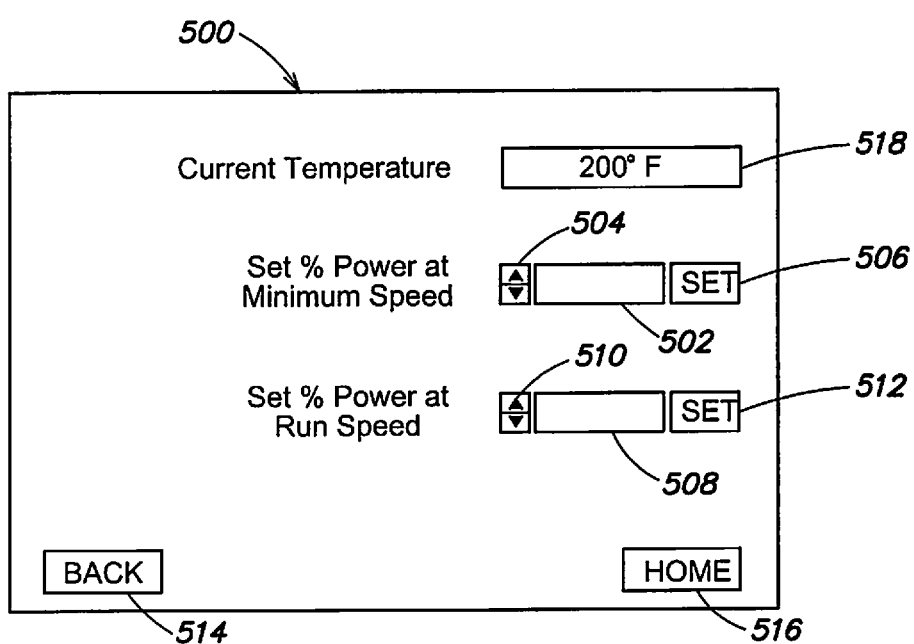
FIG. 5 is an exemplary display screen.

FIG. 5 is an example of a display screen 500 that may be shown on user interface 402. The display screen 500 may include a window 502 for receiving an amount of power as a percentage of power to be applied at a minimum speed of film portions 202, 204, such as 10 feet per minute. In the example of using a percentage of power if "5" is inputted at window 502, this indicates that pulses of power will be applied to the heating element for 5% of a complete power cycle of alternating current. So for a 5% power setting the controller would apply power to the heating element for 41.66 milliseconds out of a total cycle time of 833.333 milliseconds. The total cycle time value of 833.333 milliseconds is used because this equals the time of 50 full cycles out of a typical 60 Hertz power supply (USA standard). 50 full cycles equals 100 half cycles. The time for a half cycle is 8.333 milliseconds. A solid state relay used in the control circuits may be known "zero switching relays". The zero switching relays switch on and off only when the power cycle is at zero amplitude. The above mentioned time cycles provide control, where a 1 percent power setting equals a single half cycle of the total 100 half cycles. The window 502 may also include an associated set of soft spin buttons 504 for inputting the percent power and a soft set button 506 for setting the percent power at minimum speed in the controller 214. Similarly, a window 508, with spin buttons 510, and a set button 512 are provided for entering a percent power to be applied at a run speed of film portions 202, 204, such as 200 feet per minute. In the example, window 500 also includes soft buttons 514 and 516 for causing the controller to display a previously display screen or to display a home screen. If a temperature sensor is used with heating element 206, a window 518 will display the temperature of heating element 206.

Figure 6:
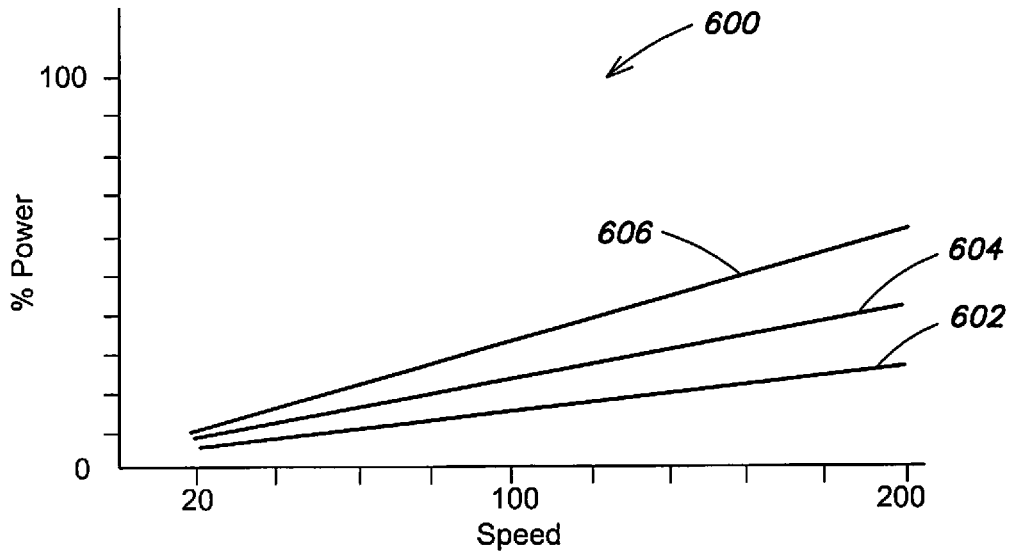
FIG. 6 is an exemplary graph of possible power curves.

In addition to adjusting an amount of power applied to the heating element 206 based on the speed of film portions 202, 204 the amount of power may be varied based further on at least one of an ambient temperature, a material forming the film portions, and a thickness of the film portions passing the heating element. FIG. 6 is a graph 600 showing three example power curves of power (in units of percentage of power) applied versus speed of film (in units of speed) for four different gauges of film. Line 602 is an example of power applied for 45 gauge and 60 gauge film such as HP type film available from Clysar, LLC of Clinton, Iowa. The two different gauges of film may be effectively sealed and trimmed using the same power settings at the various possible speeds. Line 604 is an example of the power and speed settings for 75 gauge HP film and line 606 is an example of the power and speed settings for 100 gauge HP film. Of course, if multiple gauges of film will be used with 100 gauge being the thickest film possible then controller 214 may simply use the power settings for line 606 without regard to the film gauge. However, allowing the user to factor in film gauge allows for a more efficient use of power when film portions 202, 204 are less than 100 gauge. Similarly, different power v. speed curves can be developed that account for one or more other factors such as ambient temperature and the material forming the film portions. The ambient temperature may be sensed by a sensor not shown and used to make any adjustments incorporated into the stored look-up tables, without the need for user input.

Figure 7:
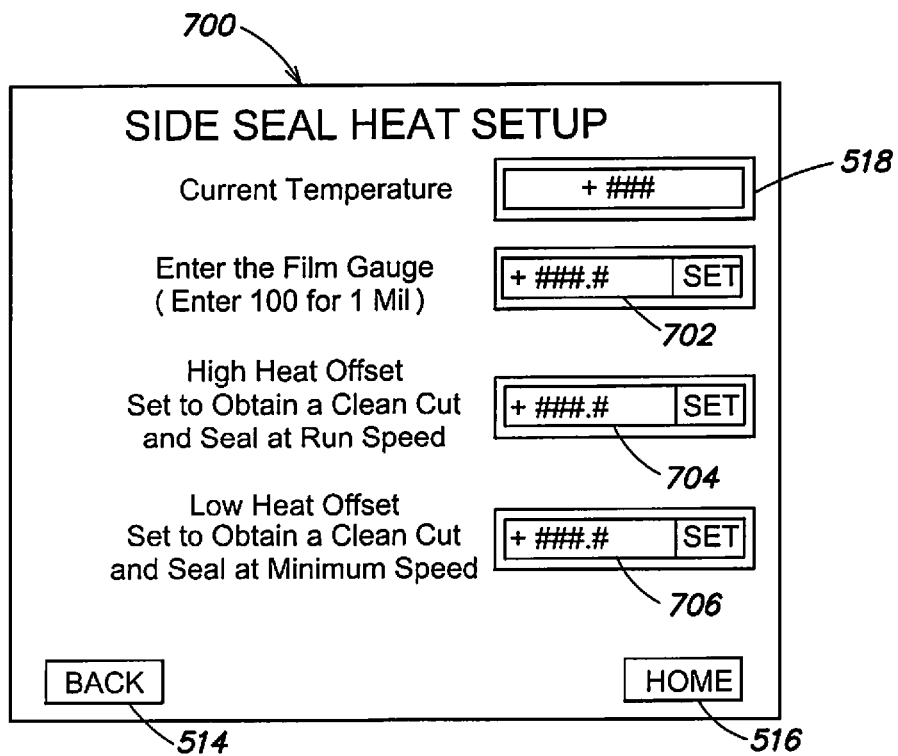
FIG. 7 is another exemplary display screen.

FIG. 7 is an example display screen 700 that includes a window 702 for receiving a gauge of film portions 202, 204 that will be used. By accounting for various gauges of film any power to be applied at various speeds may be stored in memory 220 as look-up tables with a set of values for each possible gauge. In the example of FIG. 6, the three possible power curves of power v. speed settings for the four possible film gauges may be stored in a look-up table in memory 220. Screen 700 also includes windows 704 and 706 that allow a user to adjust or offset an amount of power to be applied to the film at a run speed and a minimum speed. The reason for such an offset of power option is to allow a user to adjust the amount of power, if the stored values are found to be inadequate. The stored values may be inadequate for a number of reasons such as a different type or gauge of film is being used from the film used to generate the look-up tables, the ambient temperature or humidity is at an extreme, or other reasons as will be apparent to those skilled in the art. In such a case, controller 214 will offset, by the amounts entered in windows 704, 706, any stored look-up table values for the film gauge entered in window 702. Similarly, screen 700 may have a window (not shown) allowing a user to input a material type for the film portions 202, 204 that may indicate an adjustment or a particular look-up table corresponding to the material type entered.

An example of a look-up table for a 45 or 60 gauge film may be as follows in Table 1, with the film speed in units of length per minute and power as a percent power:

TABLE 1

| Speed | Power % |
| --- | --- |
| 0 | 5 |
| 20 | 7 |
| 30 | 8 |
| 40 | 9 |
| 50 | 10 |
| 60 | 11 |
| 70 | 12 |
| 80 | 13 |
| 90 | 14 |
| 100 | 15 |
| 110 | 16 |
| 120 | 17 |
| 130 | 18 |
| 140 | 19 |
| 150 | 20 |
| 160 | 21 |
| 170 | 22 |
| 180 | 23 |
| 190 | 24 |
| 200 | 25 |

In the example of FIG. 5, the minimum speed would be 20 and "7" would have been inputted at window 502 and a run speed may be 200 and "25" would have been inputted at window 508 and the other values of Table 1 may have been calculated by the controller 214 according to the formula above and used to create Table 1 as shown. Or in the example of FIG. 7, the film gauge of 45 would have been inputted at window 702 and the controller 214 would use Table 1 to apply power to the film according to the values in Table 1, with any offsets inputted in windows 704, 706.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

We claim:

1. A sealing apparatus for sealing together two film portions comprising:
    a pair of nip pressure devices defining a movement path of the two film portions;
    a heating element extending across the movement path for creating a seal between the two film portions and trimming the two film portions at the created seal as the two film portions move past and contact the heating element; and
    a controller connected to the heating element and a power source, the controller configured to control an amount of power applied to the heating element, wherein the controller is configured such that the amount of power applied to the heating element is varied based on at least a speed at which the two film portions move past the heating element, wherein the controller is further configured such that the amount of power applied to the heating element is varied over multiple different speeds within a speed range such that the amount of power applied to the heating element increases as the speed increases within the speed range;
    wherein the controller is configured to vary the amount of power applied to the heating element during transitions between the multiple different speeds within speed range without referencing heating element temperature to vary the amount of power.

2. The sealing apparatus of claim 1 wherein the heating element is elongated and positioned at a non-zero angle relative to a film portion plane immediately upstream of a location at which the heating element crosses the movement path.

3. The sealing apparatus of claim 1 wherein the heating element is one of a pivoting disc, a vertical wire, an inclined elongated metal tube, a non-contact radiant device, and a laser.

4. The sealing apparatus of claim 1 wherein a portion of the heating element is positioned between the pair of nip pressure devices.

5. The sealing apparatus of claim 1 wherein the power source is electricity and the controller is configured to vary at least one of current, voltage, and wattage of the heating element based on the speed at which the two film portions move past the heating element.

6. The sealing apparatus of claim 5 wherein the controller includes a modifiable square wave pulse generator and the controller is configured to operate the modifiable square wave pulse generator to provide power to the heating element at a user defined interval.

7. The sealing apparatus of claim 1 wherein the controller includes a user interface and the controller is configured to control the user interface such that the user interface enables a user to input a first power level be applied to the heating element at a first speed of the two film portions and a second power level to be applied to the heating element at a second speed of the two film portions, and the controller is further configured such that the controller generates a power curve for power to be applied to the heating element over the speed range between the first speed and the second speed.

8. The sealing apparatus of claim 7 wherein the controller is configured to generate an interpolated power curve.

9. The sealing apparatus of claim 7, wherein the power curve is stored as a look-up table in memory of the controller.

10. The sealing apparatus of claim 1 further including a thermocouple connected to the heating element and forming a part of an excessive heat indicator of the controller, and the controller is configured to utilize temperature indicated by the thermocouple solely to generate a warning of excessive heat.

11. The sealing apparatus of claim 1 wherein the controller includes a modifiable square wave pulse generator and the controller is configured to operate the modifiable square wave pulse generator to apply a varying power level series of pulses to the heating element, and the controller includes a programmable computing device configured to compute a table of power levels to be applied to the heating element over the speed range.

12. The sealing apparatus of claim 1 wherein the controller is configured such that the amount of power applied to the heating element is also varied based on at least one of an ambient temperature, a material forming the film portions, or a thickness of the film portions passing the heating element.

13. The sealing apparatus of claim 1 wherein the controller is configured such that the amount of power to be applied to the heating element for the multiple different speeds within the speed range is stored in memory of the controller.

14. A sealing apparatus for sealing together two film portions while simultaneously trimming the two film portions, comprising:
a heating element, having a portion extending across a film movement path between a pair of nip pressure devices to form a seal between the two film portions while trimming the two film portions at the seal as the two film portions move past and contact the heating element;
a controller connected to the heating element and a power source, the controller configured such that an amount of power applied to the heating element is varied based on at least a speed at which the two film portions move past the heating element;
a user interface associated with the controller, wherein the controller is configured such that the user interface enables a user to input at least two different power levels to be applied to the heating element at at least two respective different speeds of the two film portions; and
wherein the controller is configured such that, based on the at least two inputted power levels, the controller varies the amount of power applied to the heating element over a range of film speeds between the two different speeds;
wherein the controller is configured to vary the amount of power applied to the heating element during transitions between the range of film speeds without referencing heating element temperature to vary the amount of power.

15. The sealing apparatus of claim 14 wherein the power source is electricity and at least one of current, voltage, and wattage is varied by the controller to vary a heat level of the heating element.

16. The sealing apparatus of claim 15 wherein the controller includes a modifiable square wave pulse generator and the controller is configured to operate the modifiable square wave pulse generator to provide a varying level of-power to the heating element.

17. The sealing apparatus of claim 14 wherein the controller is configured to define and store a power curve in a form of a look-up table stored in memory of the controller based upon the at least two inputted power levels.

18. The sealing apparatus of claim 14 further including a thermocouple connected to the heating element and forming a part of an excessive heat indicator of the controller, and the controller is configured to utilize temperature indicated by the thermocouple solely to generate a warning of excessive heat.

19. A sealing apparatus for sealing together two film portions while simultaneously trimming the two film portions, comprising:
a pair of nip pressure devices defining a movement path of the two film portions;
a heating element positioned relative to the movement path so that the film portions will be both sealed and cut as they move past the heating element along the movement path; and
a controller connected to control power applied to the heating element from a power source, the controller configured to vary an amount of power applied to the heating element based on at least a film speed at which the two film portions move past the heating element, the controller configured to vary the amount of power applied over a plurality of different non-zero film speeds such that the amount of power applied to the heating element increases as the film speed increases;
wherein the controller is configured to vary the amount of power applied to the heating element during transitions between the plurality of different non-zero film speeds without referencing heating element temperature to vary the amount of power.

20. The sealing apparatus of claim 19 wherein the controller includes a user interface and the controller is configured to control the user interface such that the user interface enables a user to input a first power level be applied to the heating element at a first speed of the two film portions and a second power level to be applied to the heating element at a second speed of the two film portions, and the controller is further configured such that the controller generates a power verses speed curve for power to be applied to the heating element over a range of film speeds between the first speed and the second speed.

21. The sealing apparatus of claim 20, wherein the power verses speed curve is stored as a look-up table in memory of the controller.

* * * * *